United States Patent
Pidutti et al.

(10) Patent No.: US 6,984,963 B2
(45) Date of Patent: Jan. 10, 2006

(54) DEVICE FOR THE CORRECTION OF THE POWER FACTOR IN POWER SUPPLY UNITS WITH FORCED SWITCHING OPERATING IN TRANSITION MODE

(75) Inventors: Albino Pidutti, Udine (IT); Claudio Adragna, Monza (IT); Mauro Fagnani, Nerviano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 48 days.

(21) Appl. No.: 10/633,322

(22) Filed: Aug. 1, 2003

(65) Prior Publication Data

US 2004/0095101 A1 May 20, 2004

(30) Foreign Application Priority Data

Aug. 1, 2002 (EP) .............................. 02425509
Aug. 1, 2002 (EP) .............................. 02425510

(51) Int. Cl.
*G05F 1/70* (2006.01)

(52) U.S. Cl. ..................... 323/207; 323/222; 323/285
(58) Field of Classification Search ................. 323/205, 323/207, 210, 211, 222, 223, 282, 284, 285, 323/283
See application file for complete search history.

(56) References Cited

U.S. PATENT DOCUMENTS

| | | | | |
|---|---|---|---|---|
| 5,349,284 A | * | 9/1994 | Whittle ........................ | 323/207 |
| 5,867,379 A | * | 2/1999 | Maksimovic et al. ......... | 363/89 |
| 5,949,229 A | * | 9/1999 | Choi et al. ................... | 323/320 |
| 6,222,746 B1 | * | 4/2001 | Kim ............................. | 363/89 |
| 6,657,417 B1 | * | 12/2003 | Hwang ......................... | 323/222 |
| 2001/0038545 A1 | | 11/2001 | Hooijer et al. | |

FOREIGN PATENT DOCUMENTS

EP 0 582 813 A2 2/1994

* cited by examiner

*Primary Examiner*—Adolf Berhane
(74) *Attorney, Agent, or Firm*—Lisa K. Jorgenson; Byran A. Santarelli; Graybeal Jackson Haley LLP

(57) ABSTRACT

A device is described for the correction of the power factor in power supply units with forced switching operating in transition mode. Said device comprises a converter and a control device coupled with said converter so as to obtain a regulated voltage on the output terminal from an alternating network input voltage. The converter comprises a power transistor whilst the control device comprises a pilot circuit suitable for determining the switch-on time and the switch-off time of the power transistor. The control device furthermore comprises control means coupled with said pilot circuit and with said converter and capable of prolonging the switch-on time of the power transistor at the instants of time wherein the alternating network voltage substantially takes on the value zero.

25 Claims, 7 Drawing Sheets

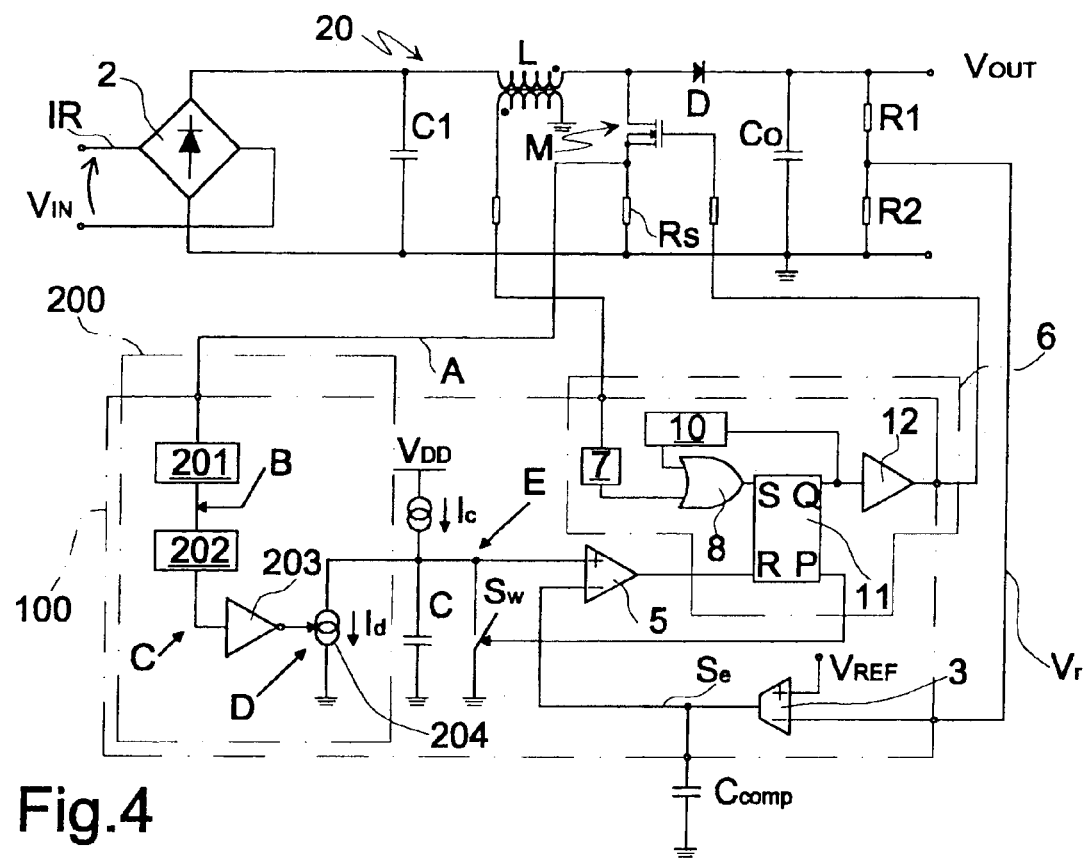
Fig.4
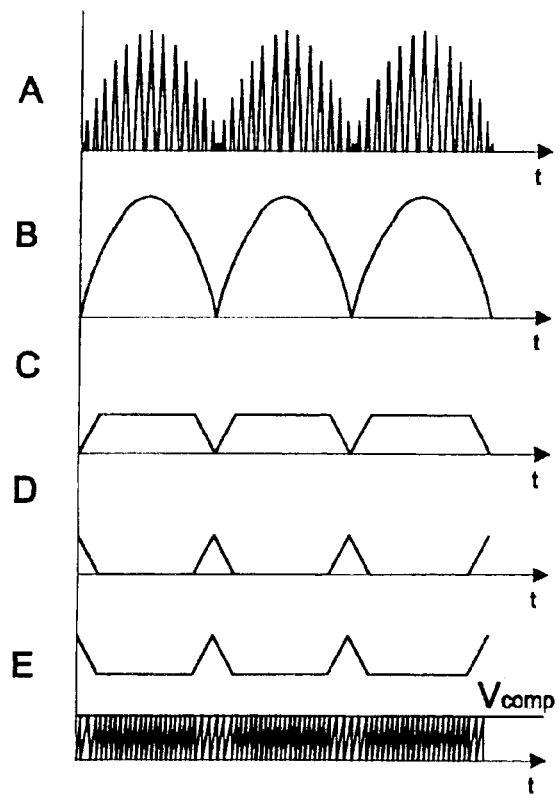
Fig.5a
Fig.5b
Fig.5c
Fig.5d
Fig.5e
Fig.5f

US 6,984,963 B2

DEVICE FOR THE CORRECTION OF THE POWER FACTOR IN POWER SUPPLY UNITS WITH FORCED SWITCHING OPERATING IN TRANSITION MODE

CROSS-REFERENCE TO RELATED APPLICATIONS

This application is related to U.S. patent application Ser. No. 10/633,321 entitled "DEVICE FOR THE CORRECTION OF THE POWER FACTOR IN POWER SUPPLY UNITS WITH FORCED SWITCHING OPERATING IN TRANSITION MODE," which was filed on the same day as the present application and which is incorporated by reference.

PRIORITY CLAIM

This application claims priority from European patent application No. 02425509.3, filed Aug. 1, 2002, and European patent application No. 02425510.1, filed Aug. 1, 2002, which are incorporated herein by reference.

TECHNICAL FIELD

The present invention refers generally to a device for the correction of the power factor in power supply units with forced switching operating in transition mode.

BACKGROUND

These devices are generally used for the active correction of the power factor (PFC) for power supply units with forced switching used in common electronic appliances such as computers, televisions, monitors, etc and to supply fluorescent lamps, in other words pre-regulation stages with forced switching which have the task of absorbing from the network supply a current that is virtually sinusoidal and is in phase with network voltage. Therefore this power supply unit with forced switching therefore comprises a PFC and a DC-DC converter connected to the PFC output.

The traditional power supply unit with forced switching comprises a DC-DC converter and an input stage connected to the electric energy distribution network consisting of a full-wave diode rectifier bridge and of a capacitor connected immediately downstream so as to produce non-regulated direct voltage from the network sinusoidal alternating voltage. The capacitor has sufficiently large capacity for the undulation at its ends to be relatively small compared with a DC level. The bridge rectifier diodes therefore conduct only a small portion of each half cycle of the network voltage because the momentary value of the network voltage is lower than the voltage on the capacitor for most of the cycle. The network current absorbed will accordingly be a series of narrow pulses the amplitude of which is 5 to 10 times the resulting average value.

This has considerable consequences: the current absorbed from the line has peak and effective values that are much greater than in the case of absorption of sinusoidal current, network voltage is distorted by the almost simultaneous pulsed absorption of all the appliances connected to the network, in the case of three-phase systems the current in the neutral conductor is greatly increased and the energy potential of the system for producing electric energy is poorly used. In fact, the wave shape of a pulsed current is very rich in odd harmonic distortions that, whilst not contributing to the power returned to the load, contribute to increasing the effective current absorbed by the network and therefore to increasing the dissipation of energy.

In quantitative terms this can be expressed in terms of power factor (PF), defined as the ratio between real power (the power that the power supply unit returns to the load plus the power dissipated inside it in the form of heat) and apparent power (the product of the effective network voltage and the effective absorbed current), both in terms of total harmonic distortion (THD), generally defined as the percentage ratio between energy associated with all the harmonic distortions of a superior order and that associated with the fundamental harmonic distortion. Typically, a power supply unit with a capacitive filter has a PF between 0.4–0.6 and a THD greater than 100%.

A PFC arranged between the rectifier bridge and the input of the DC-DC converter enables a virtually sinusoidal current to be absorbed from the network, which current is in phase with the voltage and brings PF close to 1 and reduces THD.

The PFCs generally comprise a converter provided with a power transistor and an inductor coupled with it and a control device coupled with the converter in such a way as to obtain from a network alternating input voltage a direct voltage regulated at the output. The control device is capable of determining the period of switch-on time Ton and the period of switch-off time Toff of the power transistor; uniting the period of Ton and the period of Toff time gives the cycle period or switching period of the power transistor.

The commercially available PFC circuit types are basically of two kinds that differ according to the different control technique used: pulse width modulation (PWM) control with fixed frequency wherein current is conducted continuously into an inductor of the power supply unit and variable frequency PWM control, also known as 'transition mode' (TM) because the current in the inductor is reset exactly at the end of each switching period. TM control can be operated both by controlling inductor current directly or by controlling the period of Ton time. The fixed-frequency control technique provides better performance but uses complex circuit structure whereas TM technique requires a more simple circuit structure. The first technique is generally used with high power levels whilst the second technique is used with medium to low power levels, normally below 200 W.

FIG. 1 is a diagrammatic view of a PFC pre-regulatory stage of the TM type comprising a boost converter 20 and a control device 1. The boost converter 20 comprises a full-wave diode rectifier bridge 2 with network voltage input Vin, a capacitor C1 (that is used as a high-frequency filter) with a terminal connected to the diode bridge 2 and the other terminal grounded, an inductor L connected to a terminal of the capacitor C1, an MOS power transistor M with the drain terminal connected to an inductance terminal L downstream of the latter, the source terminal being connected to ground (or optionally to ground via a resistance Rs, which is not shown in FIG. 1), a diode D having the anode connected to the common terminal of the inductor L and the transistor M and the cathode connected to a capacitor Co, the other terminal being grounded. The boost converter 20 generates direct output voltage Vout on the capacitor Co that is greater than the network maximum peak voltage, typically 400 V for systems powered by European network supplies or by universal supply. Said output voltage Vout will be the input voltage of the DC-DC converter connected to the PFC.

If it is assumed that the current absorbed from the network by the PFC in virtually stationary running conditions (in other words with constant effective input voltage and constant output load) is sinusoidal in each switch-on cycle of the transistor M, the peak current of the inductor L is Ip=Vin*Ton/L, Ton being the period of time during which the transistor M is switched on. As the input voltage is sinusoidal, if Ton is kept constant during each network cycle, the peak current of the inductor L will be enveloped by a sinusoidal current. An appropriate filter between the network and the input of the rectifier bridge (typically present for questions of electromagnetic compatibility) will filter the input current, eliminating the high-frequency components, so that the current absorbed from the network will be a sinusoidal current of the same frequency and in phase with the network current.

Normally, in PFCs of the TM type controlled in peak-current mode the constancy of switch-on time Ton is a result of forcing the peak current of the inductor to follow a sinusoidal reference. This reference is taken from the rectified voltage after the bridge, the amplitude of which is corrected with the error signal coming from the regulating loop of the output voltage, by means of a multiplier block. The constant Ton approach has the advantage that it does not require reading of the input voltage or of a multiplier block.

The control device 1 maintains the output voltage Vout at a constant value by feedback control. The control device 1 comprises an error amplifier 3 suitable for comparing part of the output voltage Vout, in other words the voltage Vr deriving from Vr=R2*Vout/(R2+R1) (where resistances R1 and R2 are serially connected together and are parallel to the capacitor Co) with a reference voltage Vref, for example 2.5V, and generates an error signal Se proportionate to their difference. The undulation frequency of output voltage Vout is double that of the network voltage and is superimposed on the direct value. However, if the band width of the error amplifier is significantly reduced (typically to below 20 Hz) by means of a compensation capacitor Ccomp and we assume virtually stationary operation, in other words with constant effective input voltage and constant output load, said undulation will be greatly attenuated and the error signal will become constant.

The error signal Se is sent to the inverting input of a comparator PWM 5 whereas at the non-inverting input a ramp signal Sslope persists, which signal is generated by a current generator Ic connected to a VDD supply, a capacitor C and a switch SW When the voltage Sslope equals the voltage Se, the comparator 5 sends a signal to a control block 6 suitable for piloting the transistor M, which in this case switches it off. As the error amplifier output is constant, the duration of the conduction period of the transistor MOS M will be constant within each network cycle. As the network load and/or voltage condition varies the error signal will change and will set the Ton value required to regulate the output voltage. As soon as the transistor MOS is switched off SW is closed and C is unloaded.

After the transistor MOS is switched off the inductor L discharges the energy stored to the load until it is completely emptied. At this point the diode D does not permit the conduction of current and the drain terminal of the transistor M remains floating, so that its voltage Vdrain moves towards the instantaneous input voltage by means of resonance oscillations between the stray capacity of the terminal and the inductance of the inductor L. The drain voltage Vdrain therefore falls rapidly, being coupled by an auxiliary coil of the inductor L with the terminal to which a block 7 is connected that detects current zeroes and that is part of the block 6. This block 7 identifies this negative front, sends a pulsed signal to an OR gate 8, the other input of which is connected to a starter 10 that is suitable for sending a signal to the OR gate 8 at the instant of start time; the output signal S of the gate 8 OR is the set input S of a set-reset flip-flop 11 with another input R that is coupled to receive the output signal of the device 5, it having two output signals, Q and P (P is the negated Q signal). The signal Q is sent to the input of a driver 12, which in this case commands the renewed switch-on of the transistor M (in other cases it can command it to be switched off), and the signal P in this case commands the opening of the switch SW (in other cases it commands it to be closed) in such a way that the capacitor C can recharge, thereby starting a new switching cycle. In this way the PFC works in transition mode.

A PFC absorbs an almost sinusoidal current that is not completely sinusoidal. There are two main sources of the residual distortion, which tends to maintain a significant THD. The first is undulation, the frequency of which is twice that of the network superimposed on the Se signal at the DC level present at the error amplifier output, which introduces a slight modulation of the Ton period of time by producing a $3^{rd}$ harmonic distortion in the current reference generated by the multiplier. The second is cross distortion, which is seen as a short flat zone in the wave form of the network current IR, at the network voltage zeroes, which correspond to the minimum values VC1 min of the voltage VC1 across the capacitor C1, as shown in FIG. 2, which shows the current IR and the voltage VC1 across the capacitor C1 in two cases with Vin=220 Vac and input power Pin=80 W (FIG. 2a) and Vin=220 Vac and Pin=40 W (FIG. 2b). The cross distortion increases as the PFC load decreases and as effective network voltage increases.

The cause of this distortion is the defective transfer of input-output energy that occurs near the zeroes of the network voltage. In this zone the energy stored in the inductor L is very low, insufficient to load the stray capacity of the drain node of the transistor M to output voltage Vout (typically 400V) so as to enable the passage of current through the diode D and transfer the energy of the inductor L to the output. As a result, the diode is not switched on for a certain number of switching cycles and the energy network remains confined in the resonating circuit consisting of said stray capacity and of the inductor L. This phenomenon, which is accentuated by the presence of the capacitor C1 that filters high frequency, is shown in detail in FIG. 3, wherein the current IR and the voltage Vdrain are shown in a zone wherein the current IR has a substantially flat wave form.

SUMMARY

In view of the state of the technique described, an embodiment of the present invention includes a device for the correction of the power factor in power supply units with forced switching operating in transition mode that enables cross distortion to be minimized.

Such a device comprises a converter and a control device coupled with said converter so as to obtain from a network alternating input voltage a voltage regulated on the output terminal, said converter comprising a power transistor, said control device comprising a pilot circuit suitable for determining the period of switch-on and switch-off time of said power transistor, characterised in that said control device comprises a control means coupled with said pilot circuit and with said converter and which is capable of prolonging said period of time during which the transistor is switched at the instants of time wherein said network alternating voltage substantially takes on the value zero.

DESCRIPTION OF THE DRAWINGS

Characteristics and advantages of the present invention will appear evident from the following detailed description of its embodiments thereof, illustrated as non-limiting examples in the enclosed drawings, in which:

FIG. 4 is a circuit diagram of a PFC in transition mode for a power supply unit with forced switching according to a first embodiment of the present invention;

FIGS. 5a–5f show significant signals of the circuit in FIG. 4;

DETAILED DESCRIPTION

Figure 1:
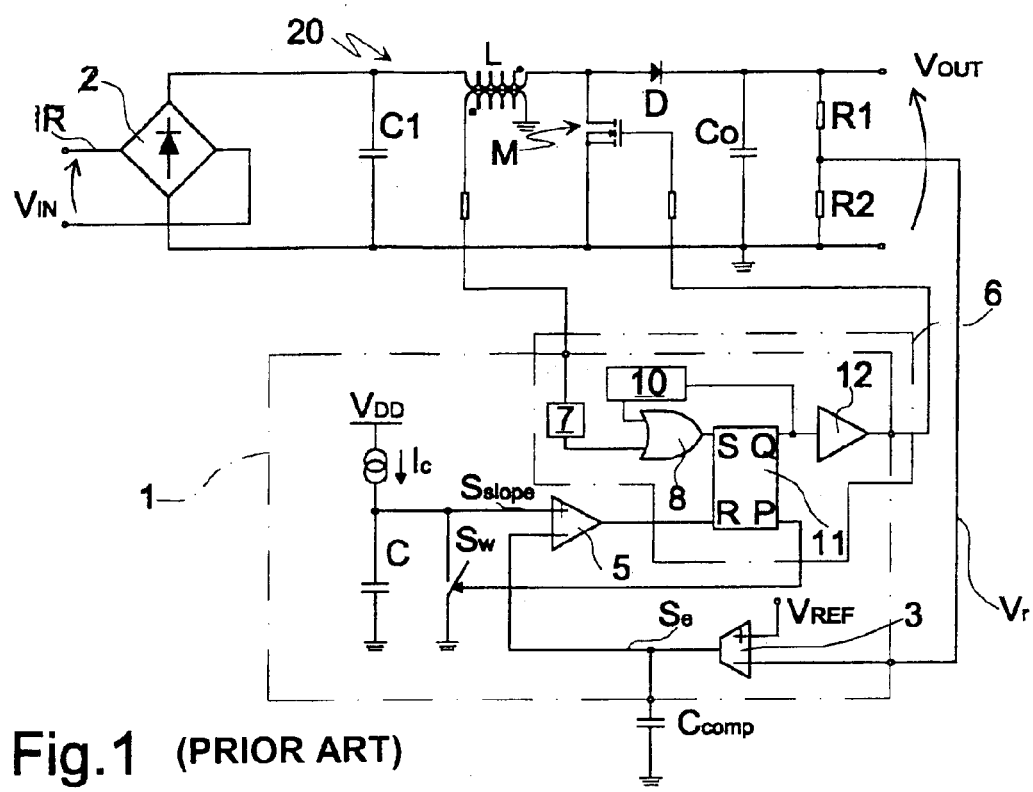
FIG. 1 is a circuit diagram of a PFC in transition mode for a prior-art power supply unit with forced switching.
Figure 3:
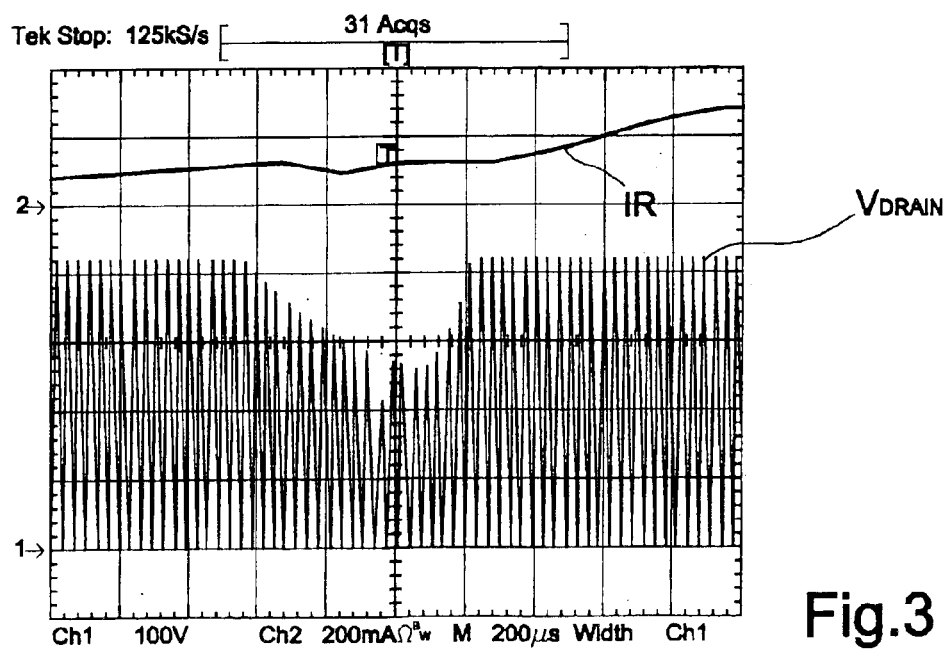
FIG. 3 shows, around a zero crossing of the network voltage, the network current and the voltage on the drain terminal of the MOS transistor of the PFC in FIG. 1.
Figure 2A:
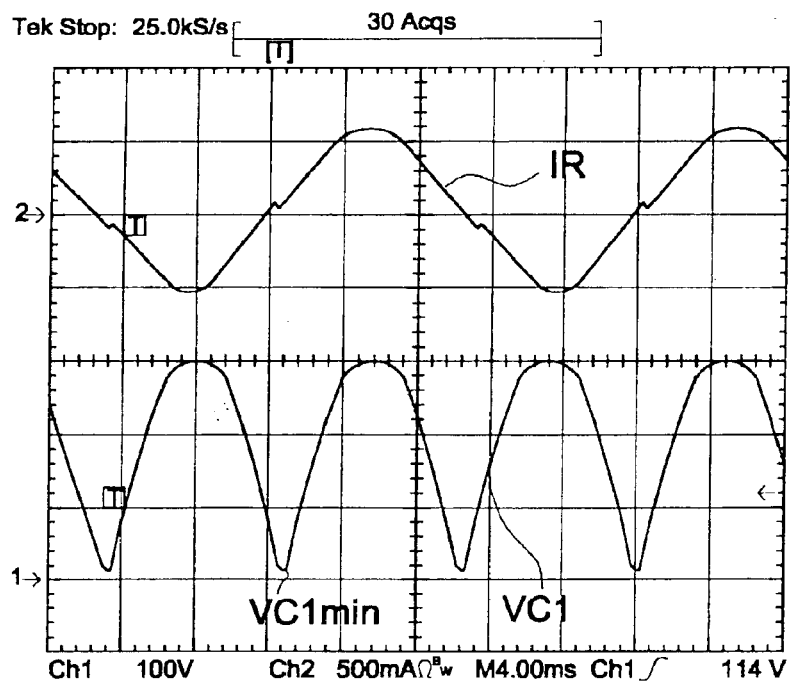
FIGS. 2a, 2b show diagrams obtained in an oscilloscope that show the network current and the rectified network voltage taken at the ends of the capacitor placed immediately after the rectifier bridge of the PFC of FIG. 1 with differing input power.
Figure 2B:
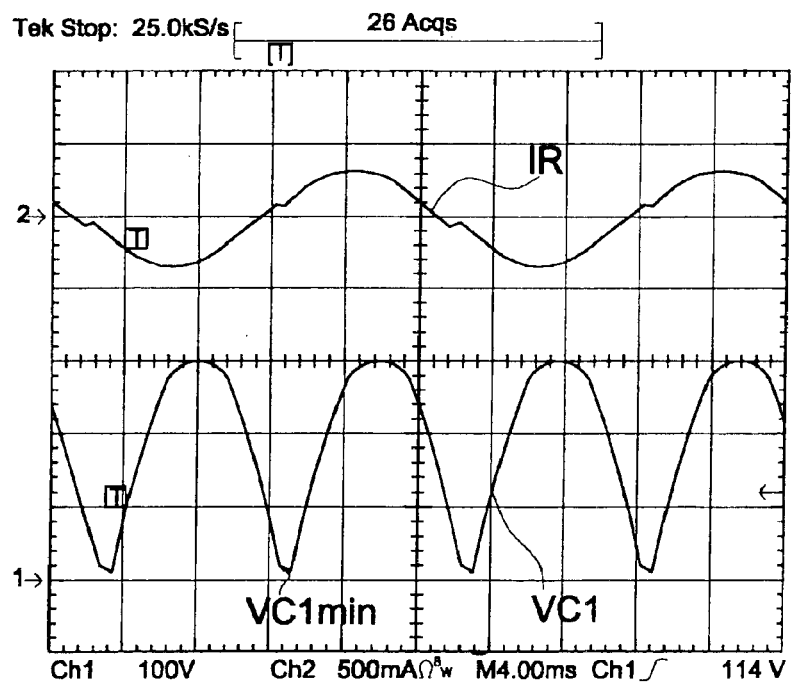

FIG. 4 is a PFC device for a power supply unit with forced switching operating in transition mode according to the first embodiment of the present invention; the elements that are the same as the circuit in FIG. 1 will be indicated by the same references. The PFC comprises a boost converter 20 comprising a full-wave diode rectifier bridge 2 that has a network input voltage Vin with a network period Tr, a capacitor C1 that has one terminal connected to the diode bridge 2 and the other terminal grounded, an inductor L connected to a terminal of the capacitor C1, a MOS power transistor M with its drain terminal connected to an inductor terminal L downstream of the latter, the source terminal being connected to a grounded resistance Rs, a diode D with its anode connected to the terminal shared by the inductor L and the transistor M and the cathode connected to a capacitor Co the other terminal of which is grounded. The boost power supply unit generates a direct output voltage Vout that is greater than the network maximum peak voltage, typically 400 V for systems powered by European network or by universal power supplies.

The PFC comprises a control device 100 that maintains output voltage Vout at a constant value by means of feedback control. The control device 100 comprises an error amplifier 3 suitable for comparing part of the output voltage Vout, in other words the voltage Vr obtained by Vr=R2*Vout/(R2+R1) (where resistances R1 and R2 are serially connected together and are connected parallel to the capacitor Co) with a reference voltage Vref, for example 2.5V, and generates an error signal Se proportionate to their difference. Output voltage Vout has an undulation, the frequency of which is twice that of the network supply and is superimposed on the DC value. If, however, the bandwidth of the error amplifier is significantly reduced (typically below 20 Hz) by means of a compensation capacitor Ccomp and we assume that operation is almost stationary, in other words with constant effective input voltage and constant output load, said undulation will be greatly attenuated and the error signal will become substantially constant.

The error signal Se is sent to the inverting input of a PWM comparator 5 whereas on the non-inverting input a ramp signal Sslope persists that is generated by a current generator Ic connected to a voltage supply VDD, a capacitor C and a switch SW. If the signals Se and Sslope are the same the comparator 5 sends a signal to a control block 6 suitable for piloting the transistor M, which in this case switches it off. As the output of the error amplifier 3 is substantially constant, the duration of the conduction period Ton of the transistor M will be substantially constant during each network cycle. As the load and/or network voltage conditions vary, the error signal Se will change and will set the value Ton required to regulate the output voltage. As soon as the MOS transistor is switched off the switch SW is closed and the capacitor Cis discharged.

A circuit 200 according to the first embodiment of the invention enables the switch-on time Ton of the MOS transistor M to be prolonged near the zeroes of the network voltage Vin, in other words when the network voltage takes on the value of a few Volts (for example 2V), a value that can be considered to be zero compared with the peak value of the network voltage. Said zeroes of the network voltage Vin correspond to the minimum values VC1 min of the voltage VC1 across the capacitor C1. In this way, a greater peak current is obtained in the inductor L.

The resistance Rs generates the voltage signal A (FIG. 5a), which shows an image of the current signal that passes through the transistor M. This signal A is supplied to the circuit 200, more precisely to a peak-detector device 201 that extracts from the signal A the sinusoidal envelope B (FIG. 5b), i.e. a rectified sinusoidal component with a period that is the same as half the period Tr of the voltage network Vin. Said signal B is supplied to the input of a limiter circuit 202 that cuts the central part of the semi-period of the network of the sinusoidal signal B by supplying a signal C (FIG. 5c). The latter is inverted by an inverter 203 and is translated upwards; the resulting signal D (FIG. 5d) commands a device 204 that is suitable for generating a current Id that is proportionate to the signal D. The current Id is therefore zero for almost the entire network semi-period except near the zeroes of the network voltage where it is subtracted from the current Ic suitable for loading the capacitor C. At such moments of time the load of the capacitor C (signal E in FIG. 5f) is slowed whereas the switch-on time Ton (FIG. 5e) is prolonged in relation to the value commanded by the output voltage of comparator 5.

The size of the correction of the switch-on time Ton can be regulated by opportunely selecting the resistance Rs.

Figure 6A:
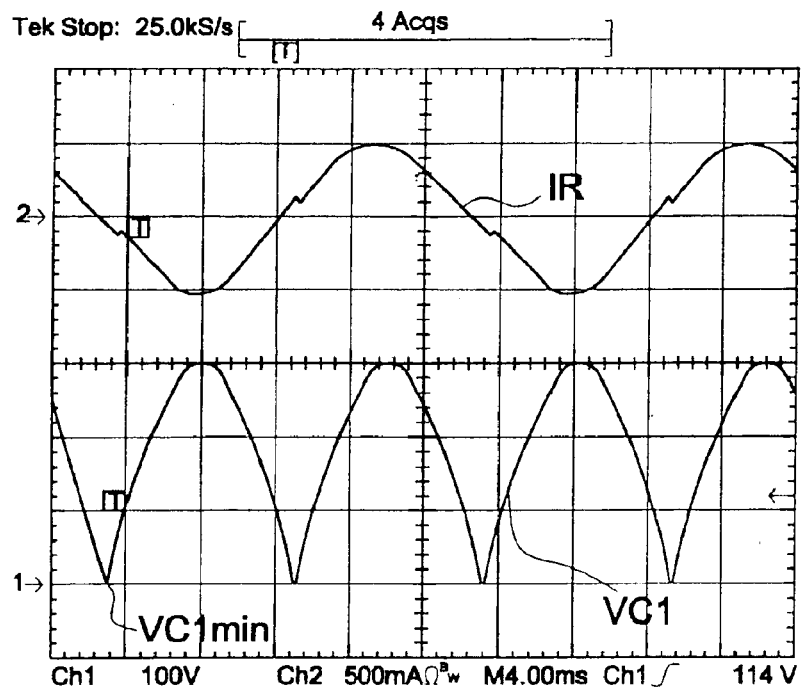
FIGS. 6a, 6b show diagrams obtained in an oscilloscope that show the network current and the rectified network voltage taken at the ends of the capacitor located immediately after the rectifier bridge of the PFC in FIG. 4 with differing input powers.
Figure 6B:
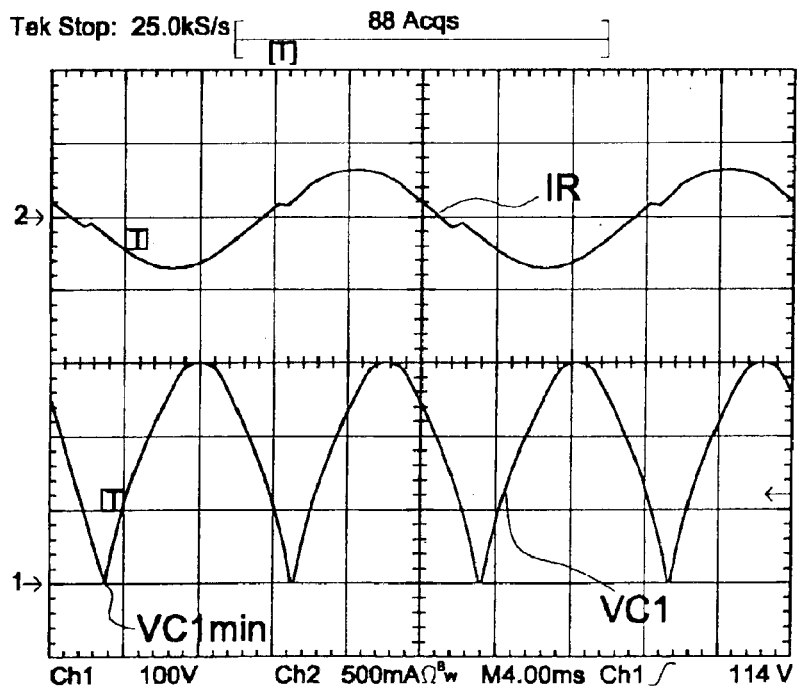
Figure 7:
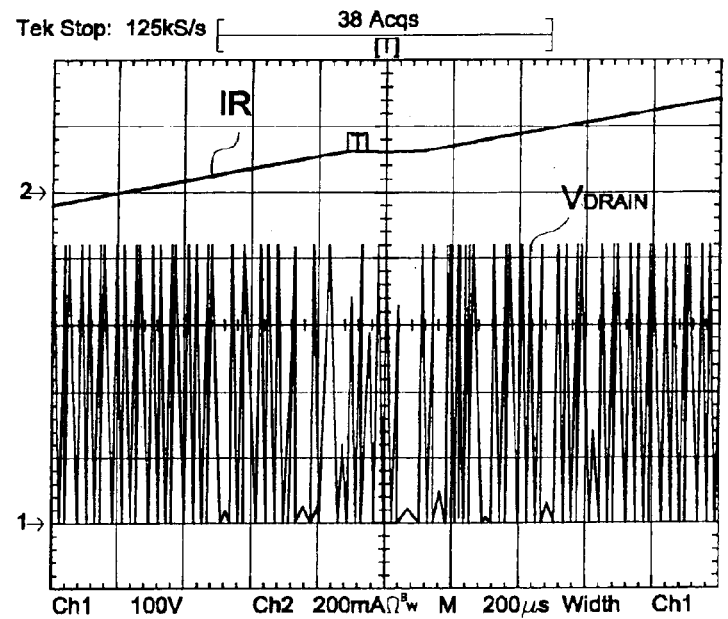
FIG. 7 shows, around a zero crossing of the network voltage, the network current and the voltage on the drain terminal of the transistor MOS of the PFC in FIG. 4.

The correction effects made by the circuit 200 can be seen in FIGS. 6a, 6b and 7. FIGS. 6a, 6b show diagrams obtained in an oscilloscope that show the current of network IR and the voltage VC1 across the capacitor C1 with respectively a voltage Vin=220 VAC and power Pin=80 W, and with voltage Vin=220 VAC and power Pin=40 W. FIG. 7 shows, at about zero of the network voltage Vin, the network current IR and the voltage Vdrain on the drain terminal of the MOS transistor M.

Figure 8:
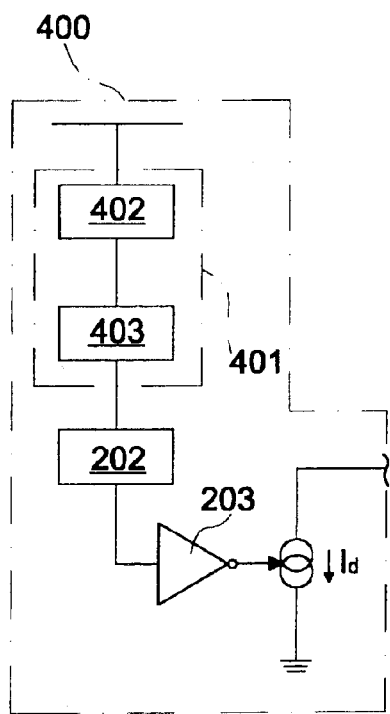
FIG. 8 is a circuit diagram of a PFC in transition mode for a power supply unit with forced switching according to a second embodiment of the present invention.
Figure 9:
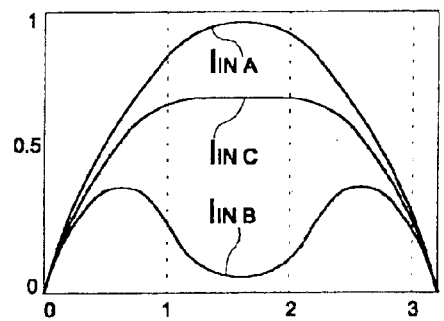
FIG. 9 shows the output signal of the block 402 of the circuit in FIG. 8 for three different circuit input signals.

FIG. 8 shows a circuit of a control device of a PFC for a power supply unit with forced switching operating in transition mode according to a second embodiment of this invention. The control device of said second embodiment is very similar to the control device 100 of the first embodiment except for the presence of the circuit 400 suitable for replacing the circuit 200 of FIG. 4 and capable of prolonging the switch-on time Ton of the MOS transistor M at the zeroes of the network voltage Vin, which correspond to the minimum VC1min values of the voltage VC1 across the capacitor C1, so as to obtain greater peak current in the inductor L. The circuit 400 is different from the circuit 200 due to the presence of a device 401 in place of the peak detector device 201. The device 401 comprises a low-pass RC filter 402 and an amplifier stage 403. The filter band is much greater than the frequency of the rectified network (e.g. 120 Hz) but much less than that of the switching frequency of the transistor M (e.g. 30 kHz). The signal detected by the RC filter 402 is therefore the average current Im cycle by cycle that passes through the MOSFET, which, as it is a series of height triangles enveloped by a sinusoidal and duration component Ton, can be expressed by:

$$Im = \frac{1}{2} I p \sin\alpha D(\alpha) = \frac{1}{2} I p \sin\alpha T on f(\alpha)$$

where D(α) is the duty cycle of the transistor M, in other words the ratio between its conduction time Ton and the switching period T, a function of the instantaneous network voltage and therefore of α, f(α)=1/T(α), the corresponding switching frequency and Ip are the value of the peak current in the transistor M at the peak of the sinusoidal current of the network voltage Vin. This signal Im for low values of the effective input voltage Vinf resembles a sinusoidal current (signal IinA in FIG. 9); as said input voltage Vinf increases the peak Ip decreases (the input power is virtually constant because the PFC load is supposed to be constant) and the form flattens to the critical value of the voltage value Vinc=√+e,fra √2/4+ee ·V$_{out}$ (Vout is the output voltage regulated by the PFC) wherein there is maximum flatness (signal linC in FIG. 9). For greater Vinf values the signal Im inflects and has a depression at the centre (signal linB in FIG. 9). The amplitude of the signal Im is, therefore, typically amplified so that the minimum of the wave form at maximum voltage Vinf is not less than the limit value of the clipping circuit in order to obtain again the same signal C that is obtained with the circuit in FIG. 4, which is used in the same way as the circuit in FIG. 4.

Figure 10:
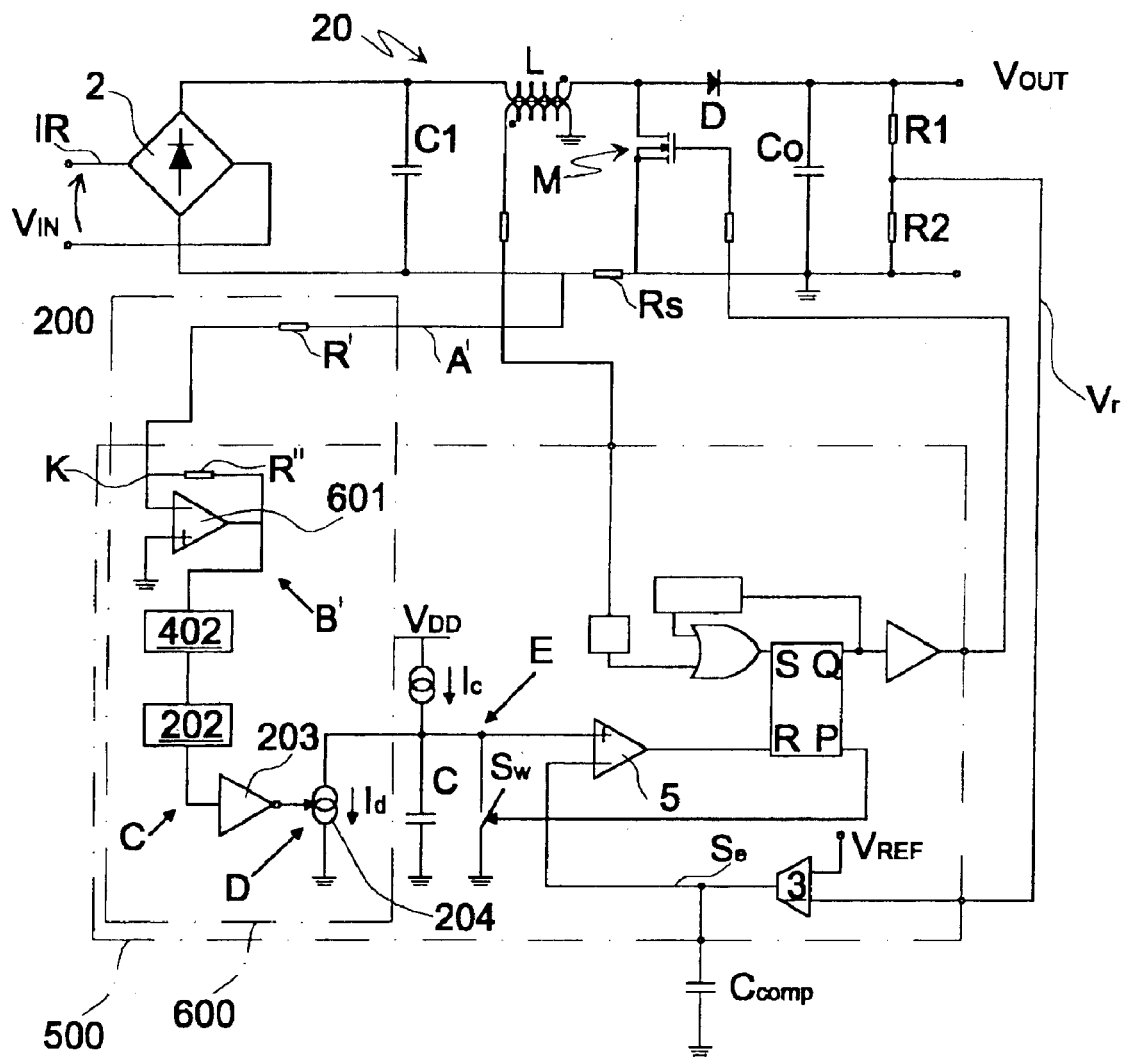
FIG. 10 is a circuit diagram of a PFC in transition mode for a power supply unit with forced switching according to a third embodiment of the present invention.
Figure 11A:
FIGS. 11a–11f show significant signals of the circuit in FIG. 10.
Figure 11B:
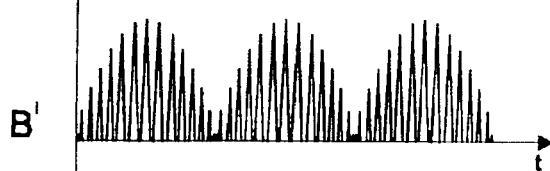
Figure 11C:
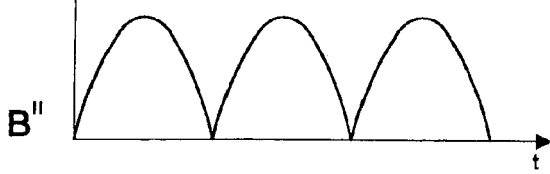
Figure 11D:
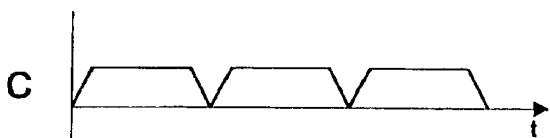
Figure 11E:
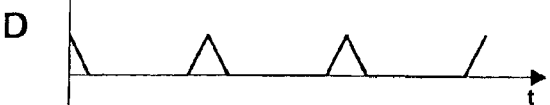
Figure 11F:
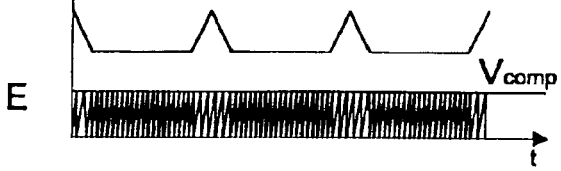

FIG. 10 shows a PFC in transition mode for a power supply unit with forced switching according to a third embodiment of this invention; the elements that are the same as the circuit of FIG. 4 will be indicated by the same references. The PFC device comprises a control device 500, which is very similar to the control device 100 of FIG. 4 except for the presence of a circuit 600 (partially similar to the circuit 400 of FIG. 8) that is capable of prolonging the switch-on time Ton of the MOS transistor M at the zeroes of the network voltage Vin, which correspond to the minimum values VC1min of the voltage VC1 across the capacitor C1, so as to obtain greater peak current in the inductor L. The circuit 500 differs from the circuit 100 also through the fact that the resistance Rs is not placed serially in relation to the transistor M but on the current return so that the same current passes through it as passes through the inductor L, consisting of a series of contiguous triangles (no longer spaced apart as in the previous case) the peak of which is enveloped by a sinusoidal component. In this case the voltage signal A' on the resistance Rs, proportionate to the current of the inductor L, will be negative. It is at the input to circuit 600 and is coupled with an input terminal K by means of a resistance R, the terminal K being coupled to the inverting input of an operational amplifier 601; the non-inverting input of the amplifier 601 is grounded. The amplifier 601 supplies the output voltage signal B' inverted in relation to the signal A' picked up and amplified by the ratio R"/R'. Said voltage signal B' is supplied to the low-pass RC filter 402. In this case the signal detected by the RC filter is proportionate to the average current cycle by cycle that passes through the inductor L, which does not suffer from the variability of its form in relation to the network voltage as previously seen for the signal Im in the second embodiment of the invention. The signal B" thereby obtained, in other words a rectified sinusoidal component with a period the same as half the period Tr of the network voltage Vin, is sent to the limiter circuit by obtaining the signal C, which is then inverted, obtaining the signal D to pilot the commanded generator Id, in the manner described previously.

Figure 12:
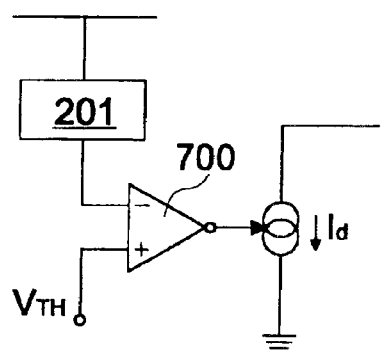
FIG. 12 is a part of a circuit diagram of a PFC in transition mode for a power supply unit with forced switching according to a variation on the preceding embodiments of the present invention.

Alternatively, the limiter circuit 202 can be replaced by a comparator 700 (FIG. 12) capable of comparing the output signal from the peak detector or from the low-pass RC filter below a certain threshold Vth and in this case activating the device Id. A variation occurs when the switch-on time Ton is triggered inside each network voltage zero in place of a progressive increase and a subsequent progressive decrease to return to the value set by the control loop.

Both the trimming voltage of the limiter device 202 and the threshold voltage Vth of the comparator device 700 may be set values or values connected with the signal Se that provides information on the size of the PFC load. As with a decreased load (to which a decrease of Se corresponds) the cross distortion that one wishes to correct deteriorates, the trimming level, or possibly the voltage Vth should increase or decrease according to the decrease of the signal Se or vice versa, so as to maximize the correction effect with lesser loads.

Table 1 shows experimental data that show the effectiveness of the correction made by the circuits of FIGS. 4 and 10. The table shows the cross distortion values THD1 for the circuit in FIG. 1, the cross distortion THD2 for the circuit in FIG. 4, the cross distortion THD3 for the circuit in FIG. 10, when there is a variation in the input voltage Vin with full load (Full) and a half load (Half).

The circuits 200 (FIG. 4), 400 (FIG. 8), 600 (FIG. 10) can be integrated into the same chip with the other components of the respective control devices 100 and 500. Furthermore, the power circuits of FIGS. 4 and 10 may be incorporated into an electronic system such as a computer system.

From the foregoing it will be appreciated that, although specific embodiments of the invention have been described herein for purposes of illustration, various modifications may be made without deviating from the spirit and scope of the invention.

TABLE 1

| Load | Vin [Vac] | THD1 | THD2 | THD3 |
|---|---|---|---|---|
| Full | 85 | 6.7% | 6.0% | 5.1% |
| | 110 | 7.7% | 6.7% | 5.4% |
| | 135 | 8.4% | 7.0% | 5.3% |
| | 175 | 9.4% | 7.2% | 4.9% |
| | 220 | 10.8% | 7.3% | 5.0% |
| | 265 | 12.3% | 7.7% | 5.7% |
| Half | 85 | 10.5% | 9.3% | 7.1% |
| | 110 | 12.1% | 10.3% | 7.4% |
| | 135 | 12.5% | 10.3% | 6.7% |
| | 175 | 12.5% | 9.4% | 5.2% |
| | 220 | 12.6% | 8.6% | 6.0% |
| | 265 | 12.8% | 8.1% | 7.1% |

What is claimed is:

1. Device for the correction of the power factor in power supply units with forced switching operating in transition mode, comprising a converter and a control device coupled with said converter so as to obtain from an alternating network input voltage a regulated voltage on the output terminal, said converter comprising a power transistor, said control device comprising a pilot circuit suitable for determining the switch-on time and the switch-off time of said power transistor, wherein said control device comprises control means coupled with said pilot circuit and with said converter and which are capable of prolonging said switch-on time period of the power transistor at the instants of time wherein said alternating network voltage substantially takes on the value zero.

2. Device according to claim 1 wherein said pilot circuit comprises an error amplifier having a first signal at the inverting terminal input that is proportionate to said regulated voltage and a reference voltage on the non-inverting terminal, means for generating a ramp voltage signal comprising a capacitor, a first generator of a current signal suitable for loading said capacitor and a switch arranged parallel to the capacitor and commanded by said pilot circuit to discharge said capacitor, a comparator capable of comparing said ramp signal with an error signal from the output of said error amplifier and capable of providing an output signal suitable for determining said switch-on time period of said power transistor, said control means being coupled with said means for generating a ramp voltage signal so as to decrease the value of the load current of the capacitor at said instants of time wherein the alternating network voltage takes on a value that is substantially zero.

3. Device according to claim 2, wherein said control means comprise a detector means suitable for extracting from a signal that is proportionate to the current that flows through said converter a rectified sinusoidal component with a period that is the same as half the period of the period of the network voltage, a second current generator coupled with said first generator and further control means which have at the input said rectified sinusoidal component and are capable of commanding said second current generator so as to decrease the value of the load current of the capacitor at said instants of time wherein the alternating network voltage takes on the value zero.

4. Device according to claim 3 wherein said detector device extracts said rectified sinusoidal component from a signal that is proportionate to the current that flows through said power transistor.

5. Device according to claim 4 wherein said detector device is a peak detector of the current signal that flows through said power transistor.

6. Device according to claim 3 wherein said converter comprises a rectifying circuit of the network voltage, a capacitor arranged parallel to said rectifying circuit and an inductor arranged between said capacitor and said power transistor, and in that said detector device extracts said rectified sinusoidal component from a signal that is proportionate to the current that flows through said inductor.

7. Device according to claim 4 wherein said detector device comprises a low-pass filter and an amplifier.

8. Device according to claim 3 wherein said further control means comprise a limiter device suitable for selecting the central part of said rectified sinusoidal component at each half of said period of the network voltage and an inverter suitable for inverting the output signal from the limiter device and commanding said second current generator.

9. Device according to claim 3 wherein said further control means comprise a comparator capable of comparing said rectified sinusoidal component with a reference voltage and the output signal of which commands said second current generator.

10. Device according to claim 1 wherein said control means can be integrated in a chip with the pilot circuit of said control device.

11. A controller for regulating an output signal that a boost converter generates from a time-varying input signal, the boost converter having a power switch and the input signal having a crossover amplitude, the controller comprising:
an error circuit operable to periodically activate the power switch for an on period that is related to the output signal; and
a distortion-reducing circuit coupled to the error circuit and operable to lengthen the on period while the input signal is within a predetermined amplitude range.

12. The controller of claim 11 wherein the error circuit comprises:
an amplifier operable to generate an error voltage that is related to the output signal;
a capacitor;
a current source operable to charge the capacitor; and
a comparator operable to activate the power switch while a voltage across the capacitor is less than the error voltage.

13. The controller of claim 11 wherein:
the error circuit comprises:
an amplifier operable to generate an error voltage that is related to the output signal,
a capacitor,
a current source operable to charge the capacitor, and
a comparator operable to activate the power switch while a voltage across the capacitor is less than the error voltage;
the on period begins substantially when the current source begins charging the capacitor; and
the on period ends substantially when the voltage across the capacitor equals the error voltage.

14. The controller of claim 11 wherein:
the error circuit comprises:
an amplifier operable to generate an error voltage that is related to the output voltage,
a capacitor,
a first current source operable to charge the capacitor,
a comparator operable to activate the power switch while a voltage across the capacitor is less than the error voltage, and the distortion-reducing circuit comprises a second current source operable to discharge the capacitor while the input signal is within the amplitude voltage range.

15. The controller of claim 11 wherein the predetermined amplitude range includes the crossover amplitude.

16. The controller of claim 11 wherein the predetermined amplitude range is centered about the crossover amplitude.

17. A power supply, comprising:
  a boost converter having a power switch and operable to generate an output voltage from a time-varying input voltage signal; and
  a controller coupled to the converter and including,
    an error circuit operable to regulate the output voltage by periodically activating the power switch for an on period that is related to the output voltage, and
    a distortion-reducing circuit coupled to the error circuit and operable to lengthen the on period while the input voltage signal is within a predetermined voltage range.

18. An electronic system, comprising:
  a power supply that includes,
    a boost converter having a power switch and operable to generate an output voltage from a time-varying input voltage signal, and
    a controller coupled to the converter and including,
      an error circuit operable to regulate the output voltage by periodically activating the power switch for an on period that is related to the output voltage, and
      a distortion-reducing circuit coupled to the error circuit and operable to lengthen the on period while the input voltage is within a predetermined voltage range.

19. A method, comprising:
  generating an output signal from a time-varying input signal having an amplitude;
  regulating the output signal by periodically drawing current through an inductor for an on period that is related to the output signal; and
  lengthening the on period while the amplitude of the input signal is within a predetermined range.

20. The method of claim 19 wherein lengthening the on period comprises lengthening the on period while the input signal is within a predetermined range that includes zero amplitude.

21. The method of claim 19 wherein lengthening the on period comprises periodically drawing the current through the inductor by closing a switch for the on period.

22. The method of claim 19 wherein:
  the output signal comprises an output voltage signal;
  the input signal comprises an input voltage signal; and
  the predetermined range comprises a predetermined voltage range.

23. The controller of claim 11 wherein the distortion-reducing circuit is operable to lengthen the on period while the input signal is within a predetermined amplitude quantity from the crossover amplitude.

24. The controller of claim 11 wherein:
  the crossover amplitude comprises a crossover current amplitude; and
  the distortion-reducing circuit is operable to lengthen the on period while the input signal is within a predetermined current from the crossover current amplitude.

25. The method of claim 19 wherein:
  the time-varying input signal has a crossover point and has a crossover amplitude at the crossover point; and
  lengthening the on period comprises lengthening the on period while amplitude of the input signal is within a predetermined amplitude quantity from the crossover amplitude.

* * * * *